Figures 1, 5, 6, 7:
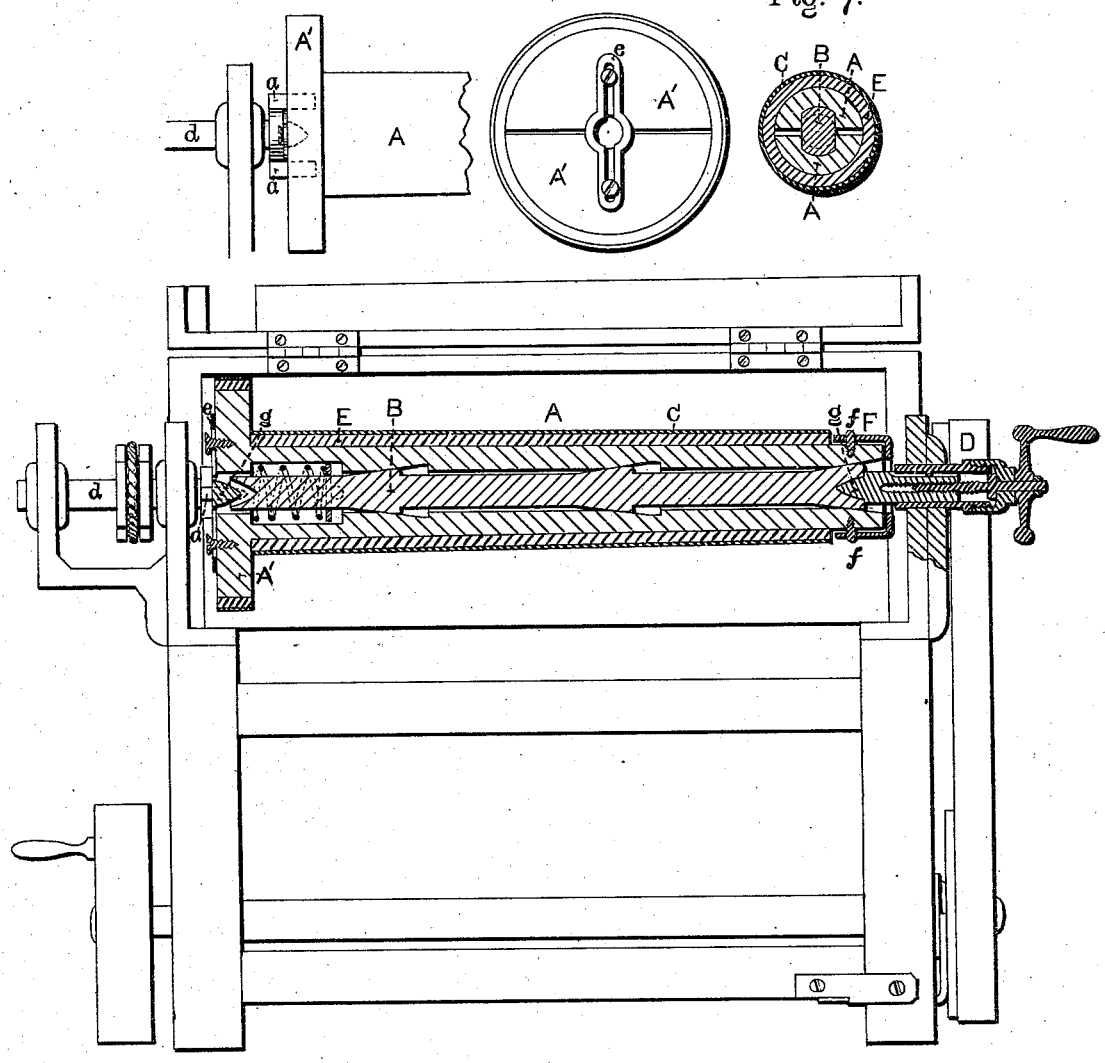

J. HOWE.
Sand-Papering Machines.

No. 154,756. Patented Sept. 8, 1874.

Witnesses.
J. E. Knop
Henry W. Holland

Inventor.
Jarvis Howe
by J. E. Maynadier
his atty

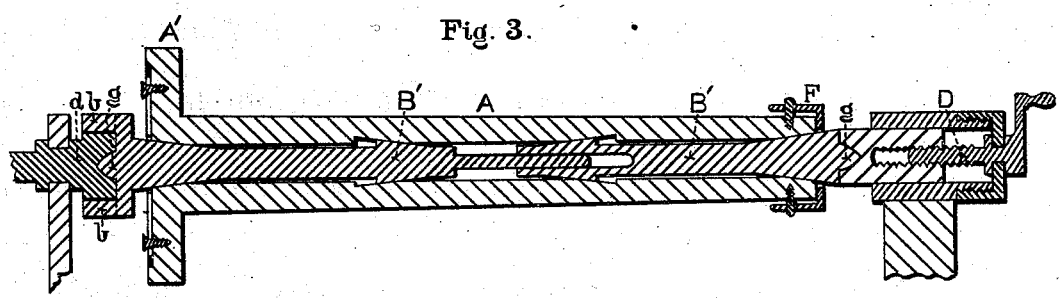
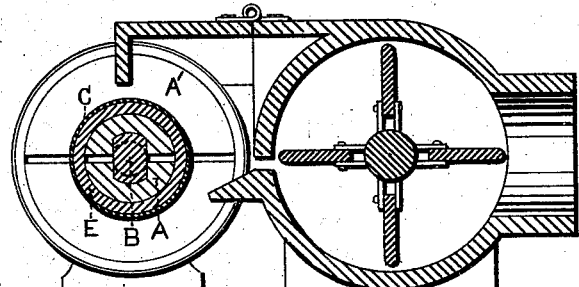
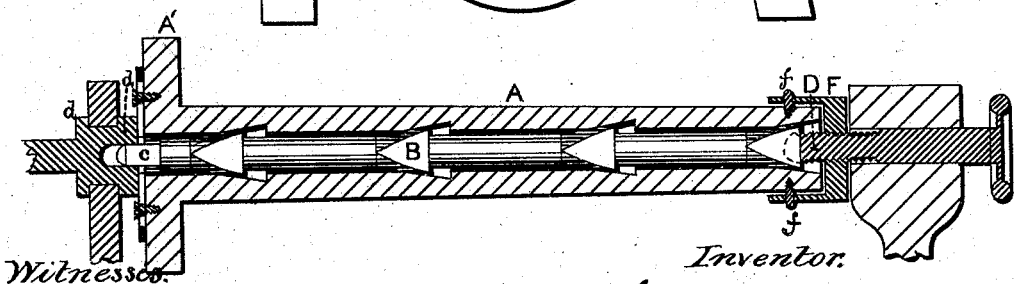

UNITED STATES PATENT OFFICE.

JARVIS HOWE, OF MILFORD, MASSACHUSETTS.

IMPROVEMENT IN SANDPAPERING-MACHINES.

Specification forming part of Letters Patent No. 154,756, dated September 8, 1874; application filed November 29, 1873.

*To all whom it may concern:*

Be it known that I, JARVIS HOWE, of Milford, in the county of Worcester and State of Massachusetts, have invented an Improvement in Sandpapering-Machine, of which the following is a specification:

Figure 1 is an elevation of my machine, showing the roll and bearings in section. Fig. 2 is a section through my machine at right angles to Fig. 1. Figs. 3 and 4 are sections of other forms of my roll. Figs. 5, 6, and 7 show details of construction, Fig. 5 showing, in elevation, one way of mounting the large end of my cylinder; Fig. 6 showing that end in elevation; and Fig. 7 showing a section through the roll, shaft, and covering.

My invention consists, first, in so mounting the sand-paper cylinder in the machine that it may be readily removed and replaced, in order that a tube of sand-paper, instead of a sheet, may be used with it; secondly, in constructing the cylinder in two or more parts, so that it may be diminished in size, in order that a cylindrical sand-paper tube may be readily pulled over it, and then expanded, so as to tightly fill this tube, and thereby keep it in its place and prevent its slipping; thirdly, in the combination of a tapering roll and a tapering sand-paper tube, whether the roll be solid or capable of expansion; fourthly, in a new kind of sand-paper tube, especially adapted for use in those machines.

The machine in which my roll is mounted and used is shown in Figs. 1 and 2, and is so well known as not to require description.

I make the body A of my roll preferably of wood, and in two or more parts, fitted to a central shaft, and cover the body with a layer of felt, rubber, or some similar material, C. The sand-paper E is used in a cylindrical or slightly-tapering form. It is slipped over the contracted roll, and the roll is mounted and distended, when it is ready for use. I prefer, also, to use a supplementary short cylinder, A', of larger diameter, attached to the other, and covered and distended in the same way, as shown in the drawings, to adapt my machine to a greater variety of work.

The distension I accomplish by forcing in wedges or wedge-shaped pieces. Figs. 1, 2, 3, and 4 show these wedge projections on the shaft B, with screw D, for forcing the shaft endwise in the roll, and thus wedging the roll apart. Fig. 5 shows the use of wedges on the end of the roll. In the machine shown in Figs. 1 and 2 both these forms of wedges are used. In the roll of Fig. 3 the wedges are on a shaft, in two parts, B' B'. In the roll of Fig. 4 the bearing of the distending-screw D is in the roll-cap F, in consequence of which the friction in the bearings is much reduced. In Figs. 1 and 2 motion is communicated by the end wedges *a a*, or the chuck or mandrel *d*. (Shown fully in Fig. 5.) In Fig. 3 the motion is communicated from the slots of the chuck *d* to the dogs *b b*, which are secured to one part of the shaft. In Fig. 4 the end *c* of the shaft is square, and is forced by the distending movement of the shaft into a square hole in the chuck or mandrel *d*, and is thus driven. Fig. 6 shows one form of the metal guide *e*, by which I secure together the parts of the roll-body. Figs. 1, 3, and 4 show another form, in the shape of a metal cap, F, attached by pegs *f* in the roll-body, playing in holes in the cap.

The sand-paper tubes E are seamless, and are made by first forming a tube of the proper paper, and then covering it with the sand while in the form of a tube. It is manufactured, in all respects, like the common sand or emery paper, except that the paper used is in a tubular form instead of a flat sheet.

I prefer to make these tubes tapering, as they can be used to some advantage even with a solid roll having the same taper. If the roll be so mounted in the machine that it can be readily removed and replaced, the small end of the tapering roll can then be easily inserted in the large end of the tapering tube, and the roll forced into the tube, so as to bind the tube securely enough for practical purposes on the roll, if the taper be slight, although the roll be solid.

I am aware that a roll formed of a cone of felt, with a cylindrical central hole drilled through it, and mounted upon a cylindrical cone of wood, is described in the patent to Gesswein, No. 133,978, December 17, 1872; but this part of my invention has no reference to rolls which are cylindrical in the part covered by the tube, nor to tubes which have a cylindrical bore, but is limited to the combination of rolls which are conical or tapering in the part covered by the tube, and tubes the bores of which are likewise conical or tapering, as above explained.

I do not claim to have invented the use of revolving rolls covered with sand-paper, for that is well known; nor of rolls distended by pressure, for the Letters Patent granted to Hapgood September 9, 1873, show a rubber roll expanded by compression between plates at the ends; but my roll is on a different principle.

I disclaim, also, the sand-paper tube shown in Hapgood's patent, which is a flat strip of sand-paper bent into the form of a tube, with its edges butted together, and secured by a strip of cloth pasted to the inside of the tube.

What I claim as my invention is—

1. The combination, in a sandpapering-machine, of the roll, spindle, chuck, and centers, constructed and operating as and for the purpose specified.

2. The expanding sand-paper roll A B, when constructed and operating substantially as above described.

3. The combination of a roll made tapering in the part to be covered, with a sand-paper tube, whose bore is likewise made tapering to correspond with that part of the roll which it is to cover, as and for the purpose specified.

4. The sand-paper tube above described, consisting of a tube of paper or equivalent material, covered with a continuous coating of sand or equivalent material, as above described.

JARVIS HOWE.

Witnesses:
J. E. KNOX,
J. E. MAYNADIER.